No. 832,634. PATENTED OCT. 9, 1906.
DE KELLER STAMEY.
COMBINATION ASH SHOVEL AND SIFTER.
APPLICATION FILED APR. 2, 1906.
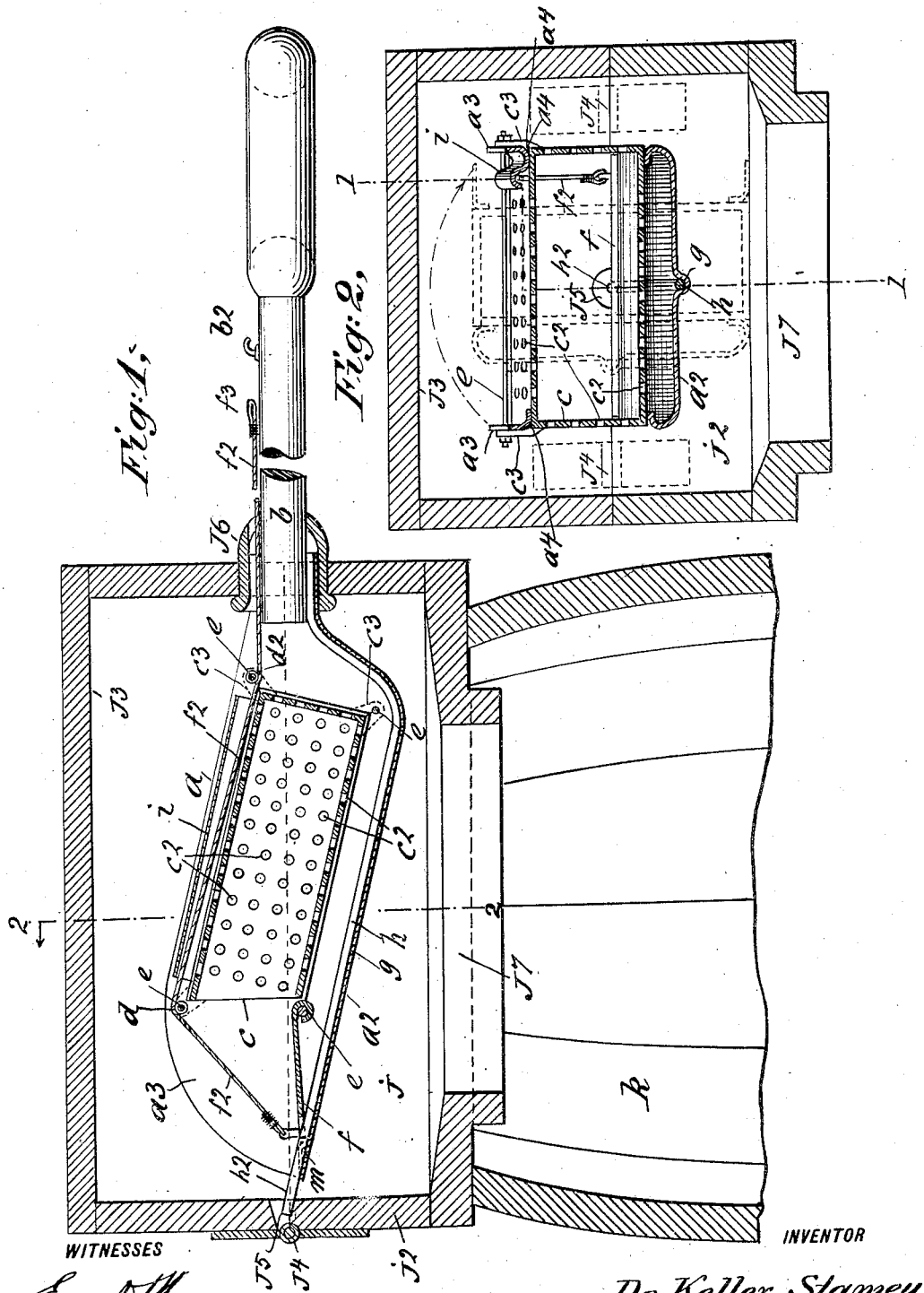
WITNESSES
INVENTOR
De Keller Stamey,
BY Edgar Tate & Co
ATTORNEYS

UNITED STATES PATENT OFFICE.

DE KELLER STAMEY, OF NEW YORK, N. Y.

COMBINATION ASH SHOVEL AND SIFTER.

No. 832,634.          Specification of Letters Patent.          Patented Oct. 9, 1906.

Application filed April 2, 1906. Serial No. 309,241.

*To all whom it may concern:*

Be it known that I, DE KELLER STAMEY, a citizen of the United States, residing at New York, in the county of New York and State of New York, have invented certain new and useful Improvements in Combination Ash Shovels and Sifters, of which the following is a specification, such as will enable those skilled in the art to which it appertains to make and use the same.

This invention relates to ash-sifters and shovels; and the object thereof is to provide an improved combination device of this class which may be used both for the purpose of an ordinary shovel for removing ashes from the ash-box of a heater of any kind or class and also as a sifter; and with this and other objects in view the invention consists of a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a sectional side view of my improved combination ash shovel and sifter, showing one method of its operation; and Fig. 2 a transverse vertical section on the line 2 2 of Fig. 1.

In the practice of my invention, I provide a shovel $a$, comprising a bottom $a^2$ and side walls $a^3$, and in the form of construction shown the bottom $a^2$ is raised at the rear end of the shovel and provided with a handle $b$, which is secured thereto or therein.

The side walls $a^3$ of the shovel are cut out to form openings $a^4$, as shown in Fig. 2, and secured in said openings is the sifter proper, which consists of an oblong box or casing $c$, the bottom, top, side, and rear end walls of which are perforated, as shown at $c^2$. The front end of the box $c$, which constitutes the sifter proper, is open, and said box is provided at its opposite corners with ears $c^3$, all of which are shown in dotted lines in Fig. 1, and the rear ears $c^3$ are shown in full lines in Fig. 2, and these ears are secured to the side walls of the shovel by rods $e$, which are passed therethrough and transversely through the shovel.

The top and bottom walls of the openings $a^4$ in the opposite side walls of the shovel are preferably curved inwardly, as shown in Fig. 2, and the open front end of the box $c$, which constitutes the sifter proper, is provided with a door $f$, which is hinged to one of the rods $e$ and is adapted to be raised or closed and lowered by means of a wire cord $f^2$, which is connected therewith and passed over a roller $d$ on the upper front rod $e$ and backwardly beneath a roller $d^2$ on the upper rear rod $e$ and along the handle $b$, and said wire cord is provided at its free end with a loop $f^3$, adapted to be connected with a hook $b^2$, secured to said handle.

In order to strengthen the shovel, and particularly the bottom thereof, I form in said bottom longitudinally thereof a groove $g$, in which is placed a rod $h$, and this rod extends the full length of the bottom of the shovel, and the front end thereof projects to form a pivot $h^2$.

The wire cord $f^2$ where it passes over the box $c$ is provided with a shield $i$, which is secured to or connected with one of the side walls $a^3$ of the shovel, and in practice a part of said side wall is preferably bent inwardly to form this shield, as shown in Fig. 2.

In practice when it is desired to use this device as an ash shovel and sifter the cord $f^2$ is detached from the hook $b^2$ and the door $f$ drops down, as shown in full lines in Fig. 1, and by means of the handle $b$ the device may be inserted into the fire-box of a heater or beneath a grate of any kind or class in such manner as to force the ashes, charred coal, cinders, and other substances into the box $c$. After this is done the cord $f^2$ is pulled backwardly and connected with the hook $b^2$. This operation raises or closes the door $f$, and the device may then be removed from the ash-box or beneath the grate of the heater and turned and agitated by means of the handle $b$ so as to sift the ashes out of the box $c$, after which the cinders, charred coal, and other substances may be dumped from said box into any suitable receptacle by releasing the cord $f^2$ from the hook $b^2$ and allowing the door $f$ to drop into the position shown in Fig. 1.

In practice I also prefer to provide a box $j$, comprising a bottom portion $j^2$ and a top portion $j^3$, said top portion being hinged to the bottom portion at one end of the box, as shown at $j^4$, and said parts are provided between the hinges at $j^4$ with an opening $j^5$, into which the pivot portion $h^2$ of the rod $h$ is passed, and the handle $b$ of the shovel is provided with a sleeve or collar $j^6$, through which the cord $f^2$ passes, and the corresponding ends of the top and bottom portions of the box j are provided with a recess adapted to receive said sleeve, and in practice the box j is opened by raising the top portion thereof, and the combination shovel and sifter is inserted into the box, as shown in Fig. 1, after which the top portion is lowered, and by turning the combination shovel and sifter and agitating the same by means of the handle b the ashes will be sifted from the box c into the bottom of the box j. I also prefer to provide a barrel or similar receptacle k, on which the box j is placed, and said box j is provided with an opening $j^7$ in the bottom thereof, through which the ashes pass into the barrel or receptacle k. The barrel or receptacle k is not absolutely necessary, and when said barrel or similar receptacle is not provided the bottom of the box j will be closed and the ashes from the box c, which constitutes the sifter proper, will fall into the bottom of the box j.

In the form of construction shown the bottom $a^2$ of the shovel is not perforated; but it will be understood that when the combination shovel and sifter is turned by means of the handle b the ashes which are sifted out of the box c will fall out of the shovel; but the bottom portion of the shovel may be perforated, if desired; but I prefer to have said bottom of the shovel without perforations.

Although I have shown and described specific forms of construction for combining the sifter c and shovel a, my invention is not limited to any particular construction for this purpose, and the sifter c may be connected with the shovel a in any desired manner, and various changes in and modifications of the construction herein shown and described may be made without departing from the spirit of my invention or sacrificing its advantages.

The door f is so formed and operated that when open, as shown in Fig. 1, it constitutes a continuous passage for the ashes and other material from the front edge of the shovel back into the box or sifter c, and the dimensions of said door are preferably such as to enable said door to fill the space between the side walls of the shovel which extend forwardly of the box or sifter c.

By means of this construction I provide a combination ash sifter and shovel which may be freely and conveniently used for the purposes specified and which may be used independent of the box j, if desired; but in practice I prefer to use said box in order that the combination sifter and shovel may be operated as a sifter without raising and distributing the dust which sometimes accompanies the manipulation of ash-sifters.

Having fully described my invention, what I claim as new, and desire to secure by Letters Patent, is—

1. A device of the class described, comprising a shovel and an ash-sifter secured on the shovel, the front end of the shovel being projected forwardly of the sifter and the bottom of the sifter being provided at its front end with a hinged door which rests on the bottom of the shovel when open, the shovel being also provided at its rear end with a handle, and means for closing the door of the sifter.

2. A device of the class described, comprising a shovel and an ash-sifter secured on the shovel, the front end of the shovel being projected forwardly of the sifter and the bottom of the sifter being provided at its front end with a hinged door which rests on the bottom of the shovel when open, the shovel being also provided at its rear end with a handle, and means for closing the door of the sifter, comprising a flexible device connected therewith and extending backwardly over the sifter to the handle.

3. A device of the class described, comprising a shovel and an ash-sifter secured longitudinally thereon, the bottom of the shovel being projected forwardly of the sifter and the front end of the sifter being provided with a hinged door which rests on the bottom of the shovel when open, and means for closing said door, the front end of the shovel being also provided with a pivot projection, and a box composed of two parts hinged together and the opposite ends of which are provided with pivotal supports for the front end of the shovel and for the handle adjacent to the rear end of the shovel, the bottom of said box being also open.

4. In an apparatus of the class described, a shovel, an ash-sifter secured on the shovel, the front end of the shovel being projected forwardly of the sifter and provided with a pivot projection, the bottom of the sifter being provided at its front end with a hinged door which rests on the bottom of the shovel when open, the shovel being also provided at its rear end with a handle, means for closing the door of the sifter, and a box composed of top and bottom portions hinged together and into which the shovel is adapted to be placed and rotated, the bottom of the box being provided with an opening.

In testimony that I claim the foregoing as my invention I have signed my name, in presence of the subscribing witnesses, this 31st day of March, 1906.

DE KELLER STAMEY.

Witnesses:
C. J. KLEIN,
F. A. STEWART.